United States Patent
Ganguli et al.

(10) Patent No.: US 8,209,083 B2
(45) Date of Patent: Jun. 26, 2012

(54) TUNABLE ARCHITECTURE FOR AIRCRAFT FAULT DETECTION

(75) Inventors: Subhabrata Ganguli, Plymouth, MN (US); George Papageorgiou, Minneapolis, MN (US); Sonja Glavaski-Radovanovic, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1287 days.

(21) Appl. No.: 11/462,481

(22) Filed: Aug. 4, 2006

(65) Prior Publication Data

US 2010/0241293 A1 Sep. 23, 2010

(51) Int. Cl.
*G01M 17/00* (2006.01)

(52) U.S. Cl. ............ 701/34.1; 701/3; 701/32.9; 706/20; 706/913

(58) Field of Classification Search .................. 701/3, 4, 701/8, 10, 11, 12, 14, 29, 31, 34, 35; 244/76 R, 244/194, 195; 706/12, 20, 25, 45–47, 913
See application file for complete search history.

(56) References Cited

U.S. PATENT DOCUMENTS

| | | | |
|---|---|---|---|
| 6,298,286 | B1 | 10/2001 | Ying |
| 6,622,134 | B1 * | 9/2003 | Sorkin ............................ 706/20 |
| 2003/0074159 | A1 * | 4/2003 | Bechhoefer et al. .......... 702/181 |
| 2005/0228783 | A1 * | 10/2005 | Shanahan et al. ................. 707/3 |

FOREIGN PATENT DOCUMENTS

| | | |
|---|---|---|
| DE | 4022954 | 1/1992 |
| EP | 1122694 | 8/2001 |
| WO | 9800334 | 1/1998 |

OTHER PUBLICATIONS

Glavaski et al, Reconfigurable Control for Active Management of Aircraft System Failures, Jun. 2001, Proceedings of the American Control Conference.*
Schneider et al, Fuzzy Logic Baased Threshold Adaption for Fault Detection in Robots, 1994, University of Duisburg.*
Sanjay, Guidance, Navigation and Control Center of Excellence, Mar. 2, 2005, Honeywell, slide 6.*
Astrom et al., "Estimator Implementation", "Adaptive Control", 1995, pp. 465-480, Publisher: Addison Wesley.
Becastro et al., "Application of Failure Detection, Identification, and Accomodation Methods for Improved Aircraft Safety", "Proceedings of the American Control Conference", Jun. 2001, pp. 2623-2624, vol. 4, Publisher: ACC, Published in: Evanston, IL.

(Continued)

*Primary Examiner* — Khoi Tran
*Assistant Examiner* — Spencer Patton
(74) *Attorney, Agent, or Firm* — Ingrassia, Fisher & Lorenz, P.C.

(57) ABSTRACT

A method for detecting faults in an aircraft is disclosed. The method involves predicting at least one state of the aircraft and tuning at least one threshold value to tightly upper bound the size of a mismatch between the at least one predicted state and a corresponding actual state of the non-faulted aircraft. If the mismatch between the at least one predicted state and the corresponding actual state is greater than or equal to the at least one threshold value, the method indicates that at least one fault has been detected.

19 Claims, 3 Drawing Sheets

OTHER PUBLICATIONS

Brinker et al., "Reconfigurable Flight Control for a Tailless Advanced Fighter Aircraft", "AIAA Guidance, Navigation, and Control Conference and Exhibit", 1998, pp. 75-87, No. 1, Publisher: AIAA With Permission From the Boeing Company.

Calise et al., "Neural Networks for Feedback Linearization in Aircraft Control", "A Collection of Technical Papers: AIAA Guidance, Navigation, and Control Conference", 1992, pp. 395-406, Publisher: AIAA.

Elgersma et al., "Parameter Identificiation for Systems With Redundant Actuators", "AIAA Guidance, Navigation, and Control Conference and Exhibit, A Collection of Technical Papers", 1998, pp. 109-117, No. 1, Publisher: AIAA.

Ganguli et al., "Piloted Simulation of Fault Detection, Isolation and Reconfiguration Algorithms for a Civil Transport Aircraft", "Proceedings of the AIAA Guidance, Navigation and Control Conference", Aug. 2005, Publisher: AIAA.

Glavaski et al., "Active Failure Management for Aircraft Control Recovery", "Proceedings of the AIAA Guidance, Navigation and Control Conference", Aug. 2002, pp. 1-8, Publisher: AIAA.

Glavaski et al, "Failure Accommodating Aircraft Control", "Proceedings of the American Control Conference", May 2002, Publisher: AACC.

Glavaski et al, "Reconfigurable Control for Active Management of Aircraft System Failures", "Proceedings of the American Control Conference", Jun. 2001, pp. 1-20, Publisher: AACC.

Gunn, "Matlab SVM Toolbox", "Support Vector Machines for Classification and Regression, Technical Report", May 10, 1998, p. 51 Publisher: University of Southampton, Published in: Southampton, UK.

Ha et al., "Generalization Bounds for Weighted Binary Classification With Applications to Statistical Verification", "International Joint Conference on Artificial Intelligence", 2005.

Jorgensen, "Feedback Linearized Aircraft Control Using Dynamic Cell Structures", "Soft Computing, Multimedia and Image Processing, Recent Trends, Principals and Applications", 1998, pp. 207-212, vol. 8, Publisher: TSI Press, Published in: Albuquerque, NM.

Kim et al., "Nonlinear Flight Control Using Neural Networks", "Journal of Guidance, Control, and Dynamics", Sep. 17, 1996, pp. 26-33, vol. 20, No. 1, Publisher: AIAA.

Mercadante, "Piloted Simulation Verification of a Control Reconfiguration Strategy for a Fighter Aircraft Under Impairments", "AGARD Conference Proceedings, Fault Tolerant Design Concepts for Highly Integrated Flight Critical Guidance and Control Systems", Oct. 1989, pp. 51-1-51-24, No. 465, Publisher: NATO Advisory Group for Areospace Research and Development, Published in: Toulouse, France.

Monaco et al., "Implementation and Flight Test Assessment of an Adaptive, Reconfigurable Flight Control System", "AIAA Guidance, Navigation, and Control Conference", Aug. 1997, pp. 1443-1454, No. 3, Publisher: AIAA.

Steinberg, "A Histrocial Overview of Research in Reconfigurable Flight Control", "Journal of Areospace Engineering: Special Issue Paper", Aug. 2005, pp. 263-275, vol. 219, No. G4, Publisher: The Institution of Mechanical Engineers.

Steinberg, "An Initial Assessment of Neural Netwrok and Fuzzy Logic Technology for Flight Control Systems", "Proceedings of the American Control Conference", Jun. 1994, pp. 173-177, vol. 1, Publisher: AACC, Published in: Baltimore, MD.

Totah, "Simulation Evaluation of a Neural-Based Flight Controller", "Proceedings of the AIAA Flight Simulation Technologies Conference, Technical Papers", 1996, pp. 259-266, Publisher: AIAA.

Tucker, "Touchdown, The Development of Propulsion Control Aircraft at NASA Dryden", "Monographs in Aerospace History", 1999, No. 16, Publisher: NASA, Published in: Washington D.C.

Weiss et al., "Integrated Restructurable Flight Control System Demonstration Results", "NASA Contractor Report 178305", May 1987, Publisher: NASA.

Gutierrez-Osuna, "Lecture Notes on Pattern Recognition and Intelligent Sensor Machines (PRISM): Lecture 21: Support Vector Machines", "http://research.cs.tamu.edu/prism/lectures.htm", access on Jun. 9, 2010, Publisher: Texas A & M University.

Ljung, L. and Soderstrom, T., "Theory and Practice of Recursive Identification, Series in Signal Processing, Optimization, and Control", 1983, pp. 370-403, No. 7, Publisher: MIT Press.

Vapnik, "Statisical Learning Theory", 1998, pp. 401-441, No. 10, Publisher: Wiley.

* cited by examiner

TUNABLE ARCHITECTURE FOR AIRCRAFT FAULT DETECTION

GOVERNMENT INTEREST STATEMENT

The invention described herein was made in the performance of work under NASA Contract No. NAS1-00107 and is subject to the provisions of Section 305 of the National Aeronautics and Space Act of 1958 (42 U.S.C. 2457).

BACKGROUND

Fast and reliable failure detection is crucial for damaged aircraft to maintain controlled flight. The two main objectives of the U.S. Government's Aviation Safety Program are to develop and demonstrate technologies that reduce aircraft accident rates, and develop technologies that reduce aviation injuries and fatalities when accidents do occur. Fault detection, isolation, and reconfiguration (FDIR) for flight control continues to be an active area of research in the aerospace community. To date, a wide variety of technologies have been demonstrated in high-fidelity simulations (that is, simulations with minimal distortions) and in actual flight tests with various levels of success.

For model-based aircraft fault detection, a mathematical model of the aircraft is used. Model-based fault detection is based on comparing measurements from the aircraft with corresponding error predictions from the aircraft model (that is, residual processing). In real life situations, the comparison of these signals is not trivial. This is due to the fact that (typically) there are imperfections in most mathematical flight simulation models coinciding with multiple sources of aircraft measurements errors. Therefore, any fault detection algorithms require fast and reliable processing in the presence of modeling and measurement errors.

SUMMARY

The following specification addresses an architecture and tuning procedure for aircraft fault detection. Particularly, in one embodiment, a method for detecting faults in an aircraft is provided. The method involves predicting at least one state of the aircraft and tuning at least one threshold value to tightly upper bound the size of a mismatch between the at least one predicted state and a corresponding actual state of the non-faulted aircraft. If the mismatch between the at least one predicted state and the corresponding actual state is greater than or equal to the at least one threshold value, the method indicates that at least one fault has been detected.

DRAWINGS

These and other features, aspects, and advantages will become better understood with regard to the following description, appended claims, and accompanying drawings where:

Like reference numbers and designations in the various drawings indicate like elements.

DETAILED DESCRIPTION

Figure 1:
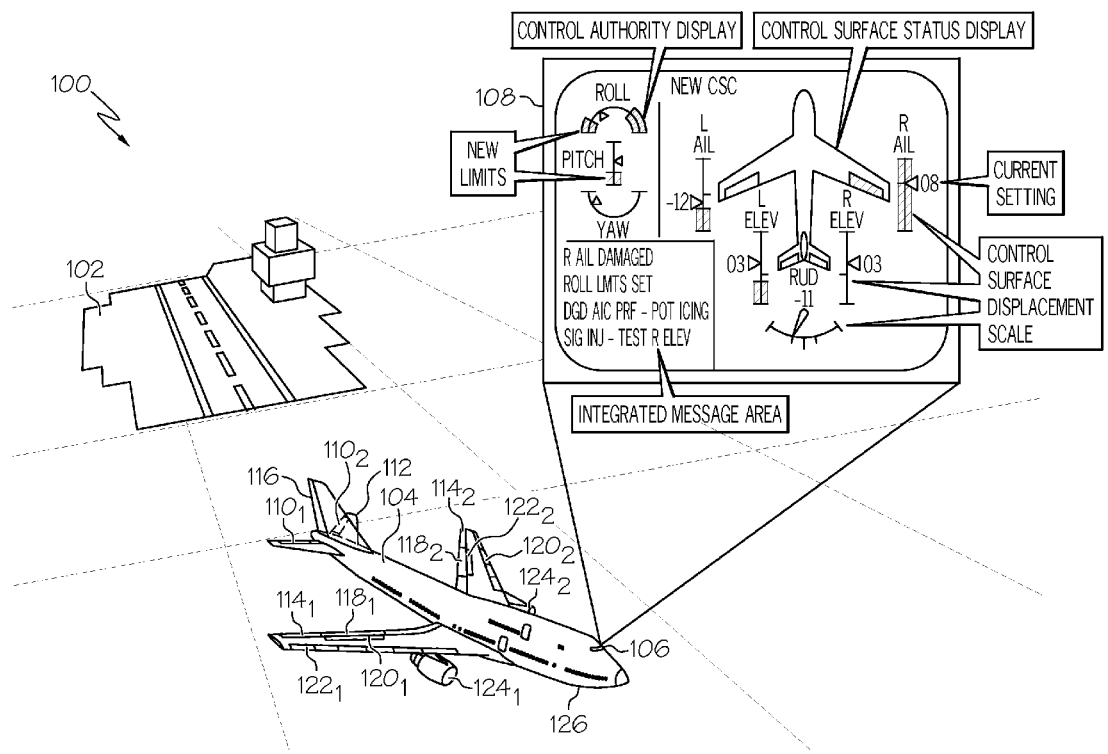
FIG. 1 is an illustration of an embodiment of a flight system.

FIG. 1 is an illustration of an embodiment of a flight system 100. The flight system 100 comprises an aircraft 104 and a flight deck 106. For the purposes of this description, FIG. 1 includes an airport 102. The airport 102 is representative of a typical airport with a runway suitable for takeoffs and landings of the aircraft 104. The flight deck 106 is responsible for activating and monitoring flight controls for the aircraft 104. The aircraft 104 is shown by way of example and not by way of limitation. In one embodiment, the aircraft 104 is representative of a typical aircraft (for example, a twin-engine transport aircraft, or the like) with longitudinal and lateral/directional axes control surfaces. In the example embodiment of FIG. 1, the plurality of control surfaces comprise, without limitation, elevators $110_1$ and $110_2$ and a stabilizer 112 for longitudinal-axis control of the aircraft 104. Additional control surfaces of the aircraft 104 include, without limitation, ailerons $114_1$ and $114_2$, a rudder 116, flaps $118_1$ and $118_2$, slats $120_1$ and $120_2$, and spoilers $122_1$ and $122_2$ to provide lateral/directional control of the aircraft 104. The aircraft 104 further includes, without limitation, engines $124_1$ and $124_2$, and landing gear 126. It is further understood that the arrangement of the plurality of control surfaces on the aircraft 104 as shown in FIG. 1 is one example of an acceptable arrangement, and that other arrangements are possible.

The flight deck 106 further includes a flight display 108. In the example embodiment of FIG. 1, the flight display 108 is a version of a flight display for a Control Upset Prevention and Recovery System (CUPRSys), or the like, that simulates aircraft failure prevention and recovery on a plurality of civilian, commercial or military aircraft. In one implementation, the flight display 108 displays, without limitation, angular acceleration of the aircraft 104 and pitch, roll and yaw of the aircraft 104 with respect to a rotating earth. The flight display 108 further indicates, without limitation, effects of current control surface positions (of the plurality of control surfaces discussed above, including the landing gear 126) on the aerodynamics of the aircraft 104. Additional aircraft state information provided by the flight display 108 includes, without limitation, performance of engines $124_1$ and $124_2$, landing gear 126, and current atmosphere and turbulence measurements. In the example embodiment of FIG. 1, any potential aircraft fault of the aircraft 104 are visually displayed in the flight deck 106 by the flight display 108. In one implementation, potential aircraft faults include, without limitation, stuck and floating flight control surfaces due to a hydraulic or mechanical malfunction, reduced surface effectiveness due to a surface loss, an engine failure, a landing gear failure, and a buildup of ice on one or more flight control surfaces.

A simulated model of the aircraft 104 includes a tunable architecture for aircraft fault detection such as further described, for example, with respect to FIG. 3 below. The tunable architecture for aircraft fault detection will substantially minimize (that is, reduce) the number of false alarms (due to any mismatches in actual aircraft states versus predicted aircraft states of the aircraft 104) while maintaining a required level of fault detection. The simulated model of the aircraft 104 (discussed below with respect to FIG. 2) is concerned with detecting faults (that is, equivalent aircraft-to-model mismatches) for proper flight deck control in the flight deck 106 during an actual flight.

Figure 2:
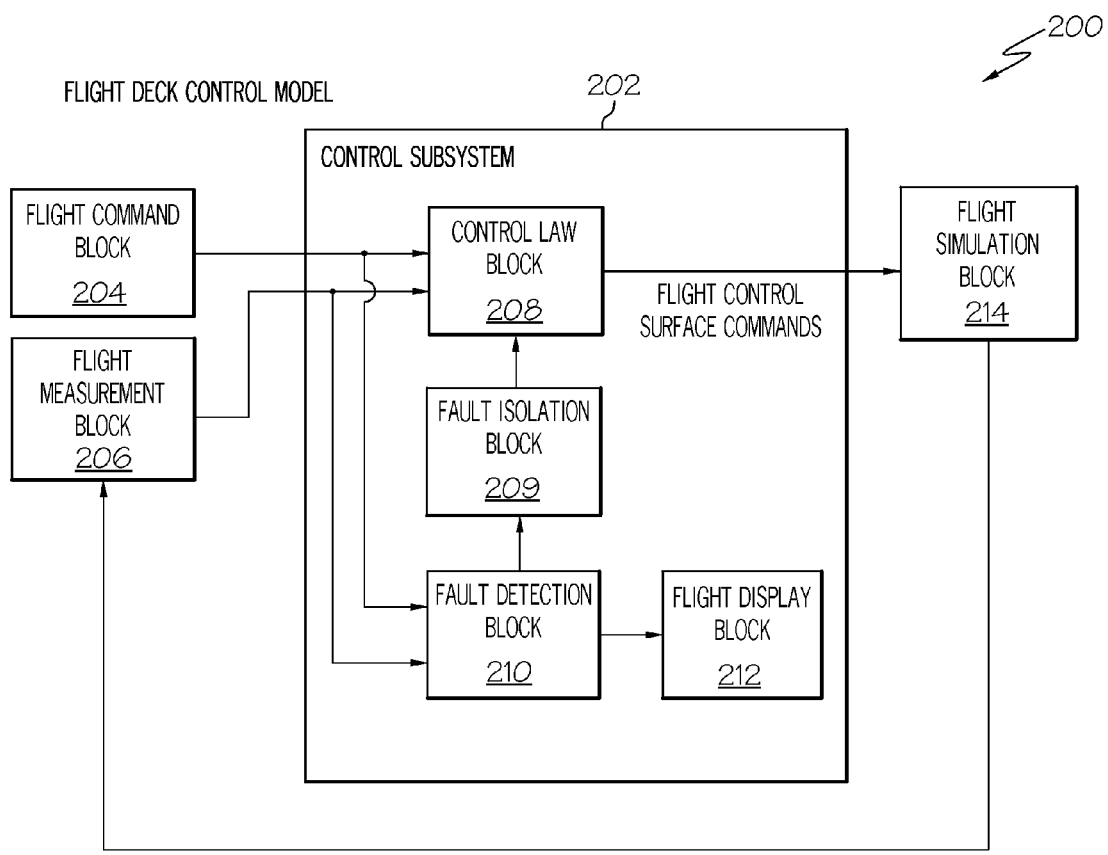
FIG. 2 is a block diagram of an embodiment of a flight deck control model.

FIG. 2 is a block diagram of an embodiment of a flight deck control model 200. In the example embodiment of FIG. 2, the flight deck control model 200 is a flight control simulation of the aircraft 104 of FIG. 1. The flight deck control model 200 further comprises a control subsystem 202, a flight command block 204, a flight measurement block 206, and a flight simulation block 214. The control subsystem 202 further includes a control law block 208, a fault isolation block 209, a fault detection block 210, and a flight display block 212. Both the flight command block 204 and the flight measurement block 206 are in communication with the control law block 208 and the fault detection block 210. The fault isolation block 209 is in communication with the control law block 208. The fault detection block 210 is in communication with the fault isolation block 209 and the flight display block 212. The flight display block 212 is representative of the flight display 108 of FIG. 1.

In one implementation, the flight command block 204 represents flight commands received from an operator (pilot) navigating the aircraft 104 of FIG. 1. Moreover, the flight simulation block 214 represents the aircraft 104. The flight simulation block 214 continuously issues one or more simulated control surface position sensor outputs and one or more aircraft state outputs to the flight measurement block 206. The flight measurement block 206 predicts at least one aircraft state of the flight simulation block 214. The flight deck control model 200 models operational behavior of the flight simulation block 214 so that any mismatch is reduced in actual movements versus predicted movements of the non-faulted aircraft model block 214. The flight deck control model 200 reconfigures control of the flight deck 106 in real-time based on a tunable fault detection algorithm and a fault isolation algorithm. The tunable fault detection algorithm is described further below in connection with FIG. 3. By incorporating the tunable fault detection algorithm, the flight deck control model 200 maintains a required level of fault detection for at least the aircraft faults discussed above with respect to FIG. 1.

In operation, the control law block 208 and fault detection block 210 receive one or more flight commands from the flight command block 204. The control law block 208 and fault detection block 210 receive one or more aircraft state measurements from the flight measurement block 206. The control law block 208 controls one or more positions of the plurality of flight control surfaces discussed above with respect to FIG. 1. To accomplish this, the control law block 208 receives one or more input commands from the flight command block 204 and the flight measurement block 206. The one or more input commands include, without limitation, a roll rate (p), a blend of pitch rate and normal acceleration ($C^*$), and an angle-of-sideslip ($\beta$). From the one or more input commands received, the control law block 208 issues one or more flight control surface commands to the flight simulation block 214. The one or more flight control surface commands include, without limitation, an aileron difference between the ailerons $114_1$ and $114_2$ of FIG. 1, an average elevator for the elevators $110_1$ and $110_2$ of FIG. 1, and the rudder 116 of the aircraft 104. In one implementation, the control law block 208 generates roll, pitch, and yaw commands based on the one or more aircraft state measurements from the flight measurement block 206. The control law block 208 allocates at least one flight control surface command for every corresponding flight control surface on the aircraft model block 214.

The fault detection block 210 models non-linear equations of motion of the aircraft 104 through a constant matrix $H^M$ (the control law block 208 uses the same model structure with a different constant matrix $H^C$). In one implementation, the fault isolation block 209 estimates the change in $H^M$ ($\Delta H^M$) for every fault that the fault detection block 210 detects using a recursive least squares (RLS) estimator. The RLS estimator receives a processed state of the aircraft 104, one or more control surface position measurements of the aircraft 104, and one or more angular accelerations of the aircraft 104 from the fault detection block 210. The fault isolation block 209 isolates at least one fault when the estimate of $\Delta H^M$ converges.

Once the at least one fault is isolated, the fault isolation block 209 updates the control law block 208 with a reconfigured control law (that is, reconfigures the $H^C$ if matrix). At substantially the same time, the pilot display block 212 notifies the flight display 108 of FIG. 1 with a status and potential impact of the at least one detected fault on the aircraft 104.

From the aircraft state measurements and the one or more flight control surface position measurements, the flight measurement block 206 predicts (that is, estimates) angular acceleration of the aircraft 104 in all three axes (that is, the x, y and z axes). The fault detection block 210 determines a difference (that is, an error) between measured and estimated angular accelerations to produce a residual signal (as further discussed in detail below with respect to FIG. 3). The residual signal is subsequently compared to a fault detection threshold within the fault detection block 210. When the residual signal is greater than the fault detection threshold, a fault is flagged on the flight display block 212. As further discussed in detail below with respect to FIG. 3, the fault detection block 210 tightly bounds one or more differences between predicted states and actual states of the non-faulted aircraft 104. The fault detection block 210 is further responsible for substantially minimizing missed fault detections and reducing false alarms. To substantially minimize and reduce false alarms due to wind gusts, the fault detection threshold within the fault detection block 210 is also made a function of measured linear accelerations.

Figure 3:
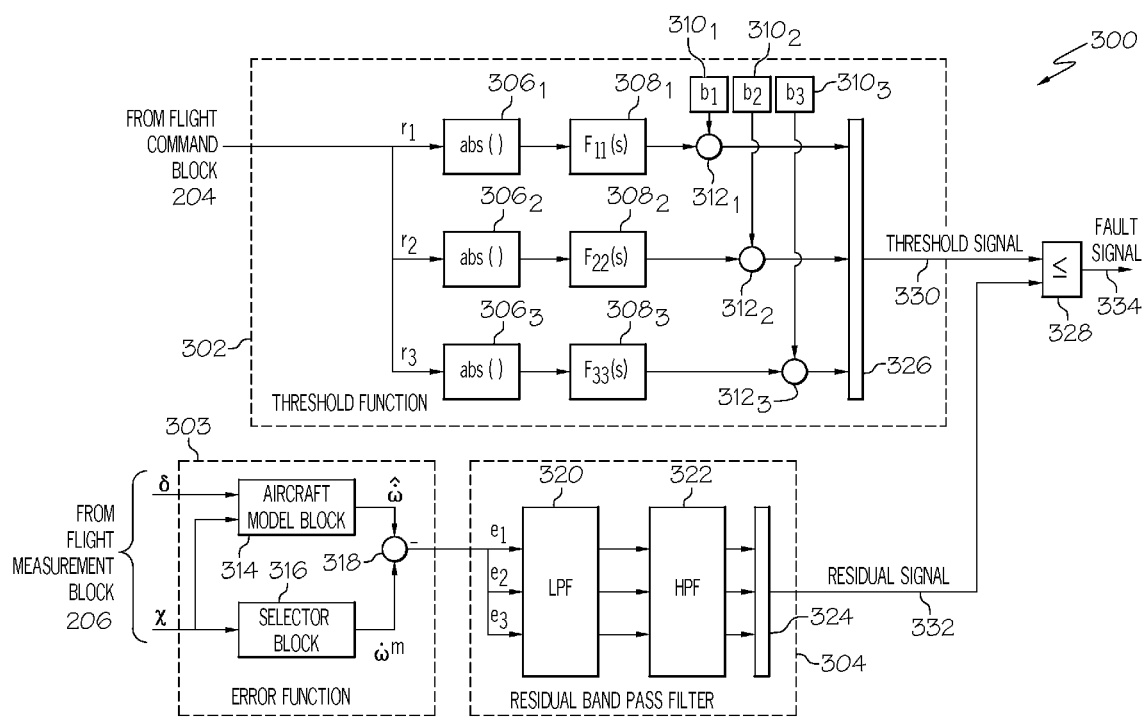
FIG. 3 is a block diagram of an embodiment of a fault detection module within the flight deck control model of FIG. 2.

FIG. 3 is a block diagram of an embodiment of a fault detection module 300 within the flight deck simulation model of FIG. 2. In the example embodiment of FIG. 3, the fault detection module 300 is further representative of the fault detection block 210 of FIG. 2 discussed above. The fault detection module 300 comprises a threshold function 302, an error function 303, and a residual band pass filter 304. The threshold function 302 further comprises absolute measurement functions $306_1$ to $306_3$, threshold filter functions $308_1$ to $308_3$, bias model blocks $310_1$ to $310_3$, threshold summation points $312_1$ to $312_3$, and a threshold signal multiplexer 326. The residual band pass filter 304 comprises a low pass filter function 320, a high pass filter function 322, and a residual signal multiplexer 324. The residual signal multiplexer 324 issues a residual signal 332 to a comparator function 328. The comparator function 328 computes a fault signal 334 as a potential fault detection signal for the flight display block 212 of FIG. 2.

The threshold function 302 accepts at least three reference commands (indicated as $r_1$ to $r_3$ in FIG. 3) from the flight command block 204 of FIG. 2. The threshold function 302 transfers each of the at least three reference commands $r_1$ to $r_3$ to corresponding absolute measurement functions $306_1$ to $306_3$ and threshold filter functions $308_1$ to $308_3$ for each axis of motion. Each threshold summation point $312_1$ to $312_3$ receives an output from the corresponding threshold filter function $308_1$ to $308_3$ and at least one bias value from corresponding bias model blocks $310_1$ to $310_3$. Each bias model block 310 compensates (accommodates) for one or more external (unmeasured) disturbances (for example, atmospheric turbulence) on each axis of motion. The threshold signal multiplexer 326 issues a threshold signal 330 to the comparator function 328.

The error function 303 comprises an aircraft model block 314 and a selector block 316 coupled to a differencer 318. The aircraft model block 314 receives one or more control surface positions and one or more actual aircraft states from the flight measurement block 206 of FIG. 2. The selector block 316 receives the one or more actual aircraft states from the flight measurement block 206. The aircraft model block 314 determines an estimated angular acceleration of the aircraft 104 (indicated as $\hat{\omega}$ in FIG. 3). The selector block 316 derives a measured angular acceleration of the aircraft 104 (indicated as $\dot{\omega}^m$ in FIG. 3) from the one or more actual aircraft states (indicated as $\chi$ in FIG. 3). As further illustrated below, the differencer 318 differences the estimated angular acceleration and the measured angular acceleration of the aircraft 104 in all three axes of motion to produce error signals $e_1$ to $e_3$. The residual band pass filter 304 filters the error signals $e_1$ to $e_3$ from the error function 303 to remove control surface trim and measurement errors, creating the residual signal 332.

Error Processing of Measured vs. Estimated Aircraft States

A model of the one or more aircraft states from the flight measurement block 206 of FIG. 2 is illustrated below in Equation 1.

$$\dot{x}=f(x,u), \omega=Cx \Rightarrow \dot{\omega}=Cf(x,u) \qquad \text{(Equation 1)}$$

With respect to Equation 1 above, $x \in R^n$ denotes an actual aircraft state vector, $u \in R^m$ denotes a control surface input vector, and $\omega \in R^3$ denotes an angular velocity vector. In one implementation, C contains zeroes and ones. Measurements of x and u are represented below in Equation 2.

$$x^m = x + \delta x, \quad u^m = u + \delta u \qquad \text{(Equation 2)}$$

With respect to Equation 2 above, $\delta x$ and $\delta u$ denote any measurement errors based on flight measurement data from the flight measurement block 206 (the flight measurement data indicated as $\delta$ and $\chi$ in FIG. 3). In particular, sources of measurement error from the flight measurement block 206 include sensor noise and sensor bias. Additional sources of measurement error include, without limitation, sensor drift, sensor dynamics, and sensor time delay. From the control surface positions and actual aircraft states provided by the flight measurement block 206, an estimated angular acceleration of the aircraft 104 is calculated in the aircraft model block 314 as illustrated below in Equation 3.

$$\begin{aligned}\hat{\dot{\omega}} &= C\hat{f}(x^m, u^m) \\ &= -J^{-1}\omega^m \times J\omega^m + \\ &\quad J^{-1}[\tau_{prop}(x^m, u^m) + \tau_{aero}(x^m, u^m)]\end{aligned} \qquad \text{(Equation 3)}$$

With respect to Equation 3 above, J represents an estimate of the inertia matrix, $\tau_{prop}$ represents an estimate of the moments generated by the propulsion system of the aircraft 104 about the center-of-gravity of the aircraft 104, and $\tau_{aero}$ represents an estimate of the aerodynamic moments about the center-of-gravity of the aircraft 104. In the example embodiment of FIG. 3, a value for measured angular acceleration $\dot{\omega}^m$ results from differentiating $\omega^m = Cx^m$ as illustrated below in Equation 4.

$$\begin{aligned}\dot{\omega}^m &= \frac{d(Cx^m)}{dt} \\ &= \frac{d(Cx + C\delta x)}{dt} \\ &= \dot{\omega} + \delta\dot{\omega}\end{aligned} \qquad \text{(Equation 4)}$$

With respect to Equation 4 above, $\delta\dot{\omega}$ represents sensor noise. Taking the difference of the measured angular acceleration of the aircraft 104 with the actual angular acceleration of the aircraft 104 results in the error signal e, as illustrated below in Equation 5.

$$\begin{aligned}e &= \hat{\dot{\omega}} - \dot{\omega}^m \\ &= \hat{\dot{\omega}} - \dot{\omega} - \delta\dot{\omega} \\ &= C\hat{f}(x+\delta x, u+\delta u) - Cf(x,u) - \delta\dot{\omega}\end{aligned} \qquad \text{(Equation 5)}$$

Subsequently, $(x_0, u_0)$ of Equation 5 is considered a trim condition of the aircraft 104 (that is, $f(x_0, u_0)=0$). Taking the Taylor series expansion of e about $(x_0, u_0)$ and keeping only first order terms results in the expression illustrated below with respect to Equation 6.

$$e \approx \underbrace{C\hat{f}(x_0+\delta x, u_0+\delta u) - \delta\dot{\omega}}_{\text{trim and measurement errors}} + \underbrace{C\Delta A \Delta x + C\Delta B \Delta u}_{\text{model mismatch}} \qquad \text{(Equation 6)}$$

With respect to Equation 6 above, $\Delta x = x - x_0$, $\Delta u = u - u_0$, $$\Delta A = \left.\frac{\partial \hat{f}(x+\delta x, u+\delta u)}{\partial x}\right|_{trim} - \left.\frac{\partial f(x,u)}{\partial x}\right|_{trim},$$

and $$\Delta B = \left.\frac{\partial \hat{f}(x+\delta x, u+\delta u)}{\partial u}\right|_{trim} - \left.\frac{\partial f(x,u)}{\partial u}\right|_{trim}$$

The residual band pass filter 304 combines each error signal $e_1$ to $e_3$ (once filtered) in the residual signal multiplexer 324 to create the residual signal 332. The low pass filter function 320 removes one or more errors due to sensor noise and high-frequency un-modeled sensor dynamics (for example, aircraft flexure of the aircraft 104) in all three axes of motion. The high pass filter function 322 removes control surface trim and sensor bias errors in all three axes of motion.

Fault Detection Error Threshold

The threshold signal 330 is the tightly bound upper limit of the one or more potential differences between the at least three reference commands $r_1$ to $r_3$ and the at least three error signals $e_1$ to $e_3$. When the comparator function 328 determines the residual signal 332 is greater than or equal to the threshold signal 330, the fault signal 334 indicates that a fault has been detected. In one implementation, the fault signal 334 equals one when the fault is detected. When the fault signal 334 is equal to one, the fault detection module 300 (the fault detection block 210) informs the fault isolation block 209 of FIG. 2 to estimate a change in $H^M$ ($\Delta M^M$) as discussed above with respect to FIG. 2. When the aircraft 104 of FIG. 1 does not experience any faults, the residual signal 332 is less than the threshold signal 330.

For each reference command r received from the flight command block 204 of FIG. 2, an upper bound is derived in the threshold function 302. The upper bound limits a modeling mismatch between estimated (that is, predictions made by the one or more reference commands r) and the non-faulted, actual aircraft states (for example, angular acceleration) from the aircraft model block 314. The threshold function 302 tightly bounds the size of the modeling mismatch in order to minimize the number of false alarms (that is, flagging a fault that has not occurred) and the number of missed detections (that is, not flagging a fault when one has occurred).

The threshold function 302 represents an upper bound of a linear time-invariant transfer matrix G(s) of the at least three reference commands $r_1$ to $r_3$ to the residual signal 332. An impulse response of G(s) is denoted by g(t), and $g_i(t)$ denotes an $i^{th}$ row of G(s). An $i^{th}$ element of $\tilde{e}$ is illustrated below in Equation 7.

$$\tilde{e}_i(t) = \int_0^t g_i(\tau) r(t-\tau) d\tau \quad \text{(Equation 7)}$$

An upper bound for $|\tilde{e}_i(t)|$ is derived as illustrated below in Equation 8.

(Equation 8)

$$|\tilde{e}_i(t)| = \left| \int_0^t g_i(\tau) r(t-\tau) d\tau \right| \leq$$

$$\int_0^t |g_i(\tau) r(t-\tau)| d\tau \leq \int_0^t \sum_{j=1}^3 |g_{ij}(\tau) r_j(t-\tau)|$$

$$d\tau \begin{pmatrix} \text{equal to } |\tilde{e}_i(t)| \text{ when} \\ r_j(t-\tau) = \text{sgn}[g_{ij}^*(\tau)], \forall \tau \leq t \end{pmatrix}$$

$$\begin{pmatrix} \text{choose } F_{ij}(s) \text{ with } \sum_{j=1}^3 |g_{ij}(\tau)| \\ |r_j(t-\tau)| \leq \sum_{j=1}^3 f_{ij}(\tau) |r_j(t-\tau)|, \forall \tau \leq t \end{pmatrix} \leq$$

$$\underbrace{\int_0^t f_{ij}(\tau) |r_j(t-\tau)| d\tau}_{\text{The threshold function 302 for } \tilde{e}_i(t)}$$

With respect to Equation 8 above, the threshold function 302 for $\tilde{e}_i(t)$ is graphically depicted in FIG. 3 as the absolute measurement functions $306_1$ to $306_3$, the threshold filter functions $308_1$ to $308_3$, and the threshold signal multiplexer 326. The threshold filter functions $308_1$ to $308_3$ (represented as first-order filters $F_{ii}(s)$ in Equation 9 below) tightly bounds $|\tilde{e}_i(t)|$. A mathematical model of the first-order filters $F_{ii}(s)$ is illustrated below with respect to Equation 9.

$$F_{ii}(s) = \frac{k_i}{T_i s + 1}, \text{ with } k_i, T_i \in R \quad \text{(Equation 9)}$$

Tunable Aircraft Fault Detection

In one implementation, to achieve a particular balance between modeling uncertainty and the number of missed detections, $T_i = 2$ seconds for all three axes with respect to Equation 9 above. The selection of filter gains $k_i$ (for the first-order filters $F_{ii}$), along with a suitable model of sensor bias from each of the bias model blocks 310, generates a fault detection classifier for each of the threshold filter functions $308_1$ to $308_3$. The fault detection classifier separates faulted flight data from non-faulted flight data for each axis of motion. The classification of faulted vs. non-faulted flight data results in a tunable threshold function 302.

In the example embodiment of FIG. 3, each of the threshold filter functions $308_1$ to $308_3$ classify every flight command dataset (from the at least three reference commands $r_1$ to $r_3$) using Statistical Learning Theory (SLT). Alternate classification methods are possible. SLT allows the threshold function 302 to learn a classifier function y =f(x) that will correctly classify unseen fault examples (that is, fault samples) as an expected risk. The expected risk measures performance of a candidate solution f as illustrated below in Equation 10.

$$R[f] = \int L(f(x), y) dP(x, y) \quad \text{(Equation 10)}$$

With respect to Equation 10 above, R is the risk functional ranging over [0, 1], P(x, y) represents a probability density function (PDF) of the filter gains $k_i$ of the threshold filter functions 308 (x) and the sensor bias from the bias model blocks 310 (y), and L is the loss function defined as illustrated below with respect to Equation 11.

$$L(f(x), y) = 0 \text{ if } f(x) = y \quad \text{(Equation 11)}$$
$$= 1 \text{ if } f(x) \neq y$$

Along with calculating the expected risk, a risk over each of the flight command datasets, or an empirical risk, is determined as illustrated below in Equation 12.

$$R_{emp}[f] = \frac{1}{N} \sum_{i=1}^N L(f(x_i), y_i) \quad \text{(Equation 12)}$$

In one implementation, an empirical risk minimization (ERM) controls complexity (that is, capacity) of the function $f$ of Equation 12 above. In one implementation, the classifier function uses a Vapnik-Chervonenkis (VC) dimension to measure complexity. The VC dimension of the classifier f measures the largest number of examples which can be modeled by a family of f. The VC dimension of the function $f$ bounds the expected risk of Equation 10 as a function of the empirical risk of Equation 12 and a number of available examples. Moreover, a probability (1−η) illustrates that the expected risk R[$f$] of classification by the function $f$ is upper-bounded by the sum of the empirical risk $R_{emp}[f]$ and a VC confidence function as illustrated in Equation 13 below.

$$R[f] \leq R_{emp}[f] + \left[ \frac{h\left(\log\left(\frac{2N}{h}\right) + 1\right) - \log\left(\frac{\eta}{4}\right)}{N} \right]^{\frac{1}{2}} \quad \text{(Equation 13)}$$

With respect to Equation 13, h is the VC dimension of f, N is the number of examples, and a second term on the right-hand side is the VC confidence function. To reduce the expected risk in classification, the classifier minimizes both the empirical risk and the VC confidence using Structural Risk Minimization (SRM). As the N/h term grows larger, the VC confidence term becomes smaller and the expected risk becomes closer to the empirical risk. For a fixed size of the dataset, the expected risk is reduced by reducing the VC dimension of the classifier.

The bound on the expected risk is used to estimate a sample size within a prescribed confidence level (that is, the sample size guarantees a desired degree of confidence in the classification results obtained by f). To estimate the sample size, ϵ represents an error tolerance between the estimated and empirical risks as illustrated below in Equation 14.

$$P(\sup(R[f]-R_{emp}[f])<\epsilon)>1-\eta \quad \text{(Equation 14)}$$

With respect to Equation 14 above, any classification based on f is (with a confidence of $(1-\eta)$) correct within a tolerance of $\epsilon$. Equation 15 is derived below based on Equations 13 and 14 above.

$$\epsilon < \left[\frac{h\left(\log\left(\frac{2N}{h}\right)+1\right)-\log\left(\frac{\eta}{4}\right)}{N}\right]^{\frac{1}{2}} \quad \text{(Equation 15)}$$

With the values of $\eta$, $\epsilon$ and h, the threshold function 302 computes the size of each of the flight command datasets (represented as N) using Equation 15. In the example embodiment of FIG. 3, one or more values are used for $\epsilon$ and $\eta$ (for example, of the order of 0.01-0.10). Moreover, using $\epsilon=0.1$, $\eta=0.01$, and h=3 (a VC dimension for a 2-D hyperplane classifier), Equation 15 computes the lower bound on N as approximately 3200. Tighter bounds for values of $\epsilon$ and $\eta$ reduce N by a substantial order of magnitude. In one implementation, N (that is, the flight command dataset) is reduced by a factor of 18.

In one implementation, a separating hyperplane substantially maximizes a margin (that is, the distance between the decision surface and the nearest data-point of each class) for the (linearly-separable) dataset from the viewpoint of SRM. A VC dimension of the separating hyperplane h with margin m bounded is illustrated below in Equation 16.

$$h \le \min\left(\frac{R^2}{m^2}, n\right)+1 \quad \text{(Equation 16)}$$

With respect to Equation 16 above, n is the dimensionality of the input space, and R is the radius of the smallest hypersphere containing all the input vectors. The fault detection module 300 substantially maximizes the margin m to substantially minimize the VC dimension of the separating hyperplane. In one implementation, the separating hyperplane has substantially no empirical error (that is, the separating hyperplane correctly separates the dataset). By correctly separating each flight command dataset into faulted and non-faulted responses, the margin is substantially maximized and the upper bound on the expected risk is substantially minimized (that is, the fault detection classifier provides a statistical guarantee that the threshold function 302 will correctly identify faulted and non-faulted flight data).

In one implementation, in order to correctly separate the reference command dataset, the separating hyperplane involves separating a set of training vectors belonging to two separate classes as illustrated below in Equation 17, with a hyperplane as illustrated below in Equation 18.

$$D=\{(x_1, y_1), (x_2, y_2), \ldots, (x_N, y_N)\}, x\in R^n, y\in\{-1,1\} \quad \text{(Equation 17)}$$

$$\langle w,x\rangle + b = 0 \quad \text{(Equation 18)}$$

In one implementation, the fault detection module 300 includes a canonical hyperplane where the parameters w (representing the filter gains $k_i$ of the threshold functions 308) and b (representing the sensor bias of the bias model blocks 310) are constrained as illustrated below in Equation 19.

$$\min_i|\langle w,x\rangle + b| = 1 \quad \text{(Equation 19)}$$

An optimal separating hyperplane must satisfy the following constraints as illustrated below in Equation 20, with a margin given as illustrated in Equation 21.

$$y_i[\langle w, x_i\rangle + b] \ge 1, i \in \{1, 2, \ldots, N\} \quad \text{(Equation 20)}$$

$$\rho(w, b) = \min_{x_i: y_i=-1}\frac{|\langle w, x_i\rangle + b|}{\|w\|} + \min_{x_i: y_i=-1}\frac{|\langle w, x_i\rangle + b|}{\|w\|}$$

$$= \frac{1}{\|w\|}\left[\begin{array}{l}\min_{x_i: y_i=-1}|\langle w, x_i\rangle + b| + \\ \min_{x_i: y_i=-1}|\langle w, x_i\rangle + b|\end{array}\right]$$

$$= \frac{2}{\|w\|} \quad \text{(Equation 21)}$$

Optimizing the dataset of each of the threshold filter functions $308_1$ to $308_3$ is illustrated below in Equations 22 and 23.

$$\max_\alpha \min_{w,b} \Phi(w, b, \alpha), \text{ where} \quad \text{(Equation 22)}$$

$$\Phi(w, b, \alpha) = \frac{1}{2}\|w\|^2 - \sum_{i=1}^N \alpha_i(y_i[\langle w, x_i\rangle + b] - 1 \quad \text{(Equation 23)}$$

With respect to Equation 23 above, $\alpha_i$ are Lagrangian multipliers with $\alpha_i \ge 0$. Casting Equation 23 as a quadratic programming (QP) problem using a dual formulation is illustrated below in Equation 24.

$$w^* = \sum_{i=1}^N \alpha_i y_i x_i$$

$$b^* = -\frac{1}{2}\langle w^* x^r + x^s\rangle \quad \text{(Equation 24)}$$

In one implementation, and with respect to Equation 24 above, $x^r$ represents a support vector from each class (that is, fault and non-fault data) of the flight command dataset, and $x^s$ represents a support vector from each class of the sensor bias readings that both satisfy Equation 25 as illustrated below.

$$\alpha^r, \alpha^s > 0, y^r = -1, y^s = 1 \quad \text{(Equation 25)}$$

With respect to Equation 25 above, a classifier function for the support vectors $x^r$ and $x^s$ is illustrated below in Equation 26.

$$f(x) = sgn(\langle w^*, x\rangle + b^*) \quad \text{(Equation 26)}$$

With respect to Equation 26 above, w*(a vector of size 3) represents the optimal gains $k_i$ for each of the threshold filter functions $308_1$ to $308_3$, and b*(a vector of size 3) represents the optimal bias for each of the bias model blocks $310_1$ to $310_3$. The support vectors $x^r$ and $x^s$ classify the faulted and non-faulted flight command data in each of the threshold filter functions $308_1$ to $308_3$. The fault detection classifier trains (that is, tunes) the threshold function 302 to optimally classify the faulted and non-faulted flight data and ignore the non-faulted data.

While the methods and techniques described here have been described in the context of a fully-functioning simulated aircraft fault detection system, apparatus embodying these techniques are capable of being distributed in the form of a computer readable medium of instructions and a variety of forms that apply equally regardless of the particular type of signal bearing media actually used to carry out the distribution. Examples of computer readable media include recordable-type media, such as a portable memory device, a hard disk drive, a RAM, CD-ROMs, DVD-ROMs; and transmission-type media, such as digital and analog communications links, wired or wireless communications links using transmission forms such as, for example, radio frequency and light wave transmissions. The computer readable media may take the form of coded formats that are decoded for actual use in an aircraft flight system, including flight system 100 of FIG. 1.

What is claimed is:

1. A method for detecting faults in an aircraft, the method comprising:
   in a programmable processor:
   predicting at least one state of the aircraft;
   processing corresponding actual, non-faulted aircraft state and a faulty aircraft state to at least one bias value and at one threshold filter function;
   generating at least one threshold value based on a first reference command signal;
   tuning the at least one threshold value to upper bound the size of a mismatch between the at least one predicted state and the corresponding actual state based on the at least one bias value and the at least one threshold filter function; and
   if the mismatch between the at least one predicted state and the corresponding actual state is greater than or equal to the at least one threshold value, indicating that at least one fault has been detected.

2. The method of claim 1, wherein predicting the at least one state further comprises estimating angular acceleration of the aircraft.

3. The method of claim 1, further comprising classifying the faulted flight data from the non-faulted flight data for each axis of motion.

4. The method of claim 3, wherein the at least one threshold filter function and the at least one bias value statistically guarantee the classification of the faulted and non-faulted flight data within a prescribed confidence level.

5. The method of claim 1, wherein indicating that the at least one fault has been detected further comprises notifying a display on a flight deck of the aircraft upon successful detection of the at least one fault.

6. The method of claim 1, wherein tuning the at least one threshold value to upper bound the size of a mismatch further comprises:
   filtering an absolute value of the first reference command signal with the at least one threshold filter function to generate a filtered reference command signal; and
   adding the at least one bias value to the filtered reference command signal.

7. The method of claim 1, wherein the at least one threshold filter function comprises a filter gain.

8. A method for detecting faults in an aircraft, the method comprising:
   in a programmable processor:
   predicting at least one aircraft state based on responses from flight measurement data;
   calculating a difference between the predicted aircraft state and a corresponding measured state of the aircraft;
   processing a corresponding actual, non-faulted aircraft state and a faulty aircraft state to calculate at least one filter gain and at least one bias value;
   determining a threshold of an upper bound for the difference between the predicted aircraft state and the corresponding measured state based on the at least one bias value and the at least one filter gain;
   comparing the threshold with the difference between the predicted aircraft state and the corresponding measured state; and
   if the difference is greater than or equal to the threshold, indicating that at least one fault has been detected.

9. The method of claim 8, wherein predicting the at least one aircraft state comprises estimating operational behavior of the aircraft in a non-fault state in response to one or more reference commands.

10. The method of claim 8, wherein calculating the difference further comprises deriving the corresponding measured state from actual flight measurement data.

11. The method of claim 8, wherein determining the threshold further comprises:
    classifying faulted and non-faulted flight measurement data; and
    ignoring the non-faulted flight measurement data.

12. The method of claim 11, further comprising calculating the at least one filter gain and the at least one bias value that statistically guarantees the classification of the faulted and non-faulted flight measurement data within a prescribed confidence level.

13. The method of claim 8, wherein indicating further comprises notifying a flight deck control display with a status and potential impact of the at least one detected fault on the aircraft.

14. The method of claim 8, wherein determining the threshold further comprises wherein the threshold is based on a first reference command signal.

15. The method of claim 14, wherein determining the threshold further comprises filtering an absolute value of the first reference command signal with the at least one filter gain and adding the at least one bias value.

16. A method for detecting a fault in an aircraft, comprising:
    in a programmable processor:
    generating a threshold signal based on at least one bias value added to a reference command signal filtered by at least one threshold filter function;
    generating a residual signal based on a band passed filtered error function, wherein the band passed filtered error function is based on the difference between a measured state of the aircraft and a corresponding estimated state;
    comparing the threshold signal and the residual signal;
    tuning the threshold signal based on processing a corresponding actual, non-faulted aircraft state and a faulted aircraft state to compute the at least one bias value and at least one threshold filter function; and
    indicating that at least one fault is detected when the residual signal is equal to or greater than the threshold signal.

17. The method of claim 16, wherein tuning the threshold signal further comprises classifying faulted flight data from non-faulted flight data for each axis of motion.

18. The method of claim 17, wherein classifying faulted flight data from non-faulted flight data for each axis of motion further comprises calculating at least one threshold filter function and at least one bias value that statistically guarantees the classification of the faulted and non-faulted flight data within a prescribed confidence level.

19. The method of claim 16, wherein indicating further comprises displaying a notification on a flight deck of the aircraft.

* * * * *